(12) United States Patent
Stokes et al.

(10) Patent No.: US 12,473,416 B2
(45) Date of Patent: *Nov. 18, 2025

(54) FUNCTIONALIZED POROUS MEMBRANES AND METHODS OF MANUFACTURE AND USE

(71) Applicant: Celgard, LLC, Charlotte, NC (US)

(72) Inventors: Kristoffer K. Stokes, Lunenburg, MA (US); Karl F. Humiston, Tucson, AZ (US)

(73) Assignee: Celgard, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/374,677

(22) Filed: Sep. 29, 2023

(65) Prior Publication Data

US 2024/0026111 A1    Jan. 25, 2024

Related U.S. Application Data

(62) Division of application No. 17/476,737, filed on Sep. 16, 2021, now Pat. No. 11,807,733, which is a
(Continued)

(51) Int. Cl.
*C08J 9/36* (2006.01)
*B32B 27/00* (2006.01)
(Continued)

(52) U.S. Cl.
CPC ............... *C08J 9/36* (2013.01); *B32B 27/00* (2013.01); *B32B 27/12* (2013.01); *B32B 27/32* (2013.01);
(Continued)

(58) Field of Classification Search
None
See application file for complete search history.

(56) References Cited

U.S. PATENT DOCUMENTS 5,362,553 A * 11/1994 Dillon .................. B29C 48/022
442/87
6,057,061 A    5/2000 Callahan et al.
(Continued)

FOREIGN PATENT DOCUMENTS

| JP | H10265596 | 10/1998 |
| JP | 2011110474 | 6/2011 |
| WO | WO2013/012905 | 1/2013 |

OTHER PUBLICATIONS

R. Kesting, "Synthetic Polymeric Membranes, A Structural Perspective," 2 ed., John Wiley & Sons (New York, NY), (1985).
(Continued)

*Primary Examiner* — Chinessa T. Golden
(74) *Attorney, Agent, or Firm* — J. Clinton Wimbish; Maynard Nexsen PC

(57) ABSTRACT

A functionalized microporous, mesoporous, or nanoporous membrane, material, textile, composite, laminate, or the like, and/or a method of making or using such functionalized membranes. The functionalized porous membrane may be a functionalized microporous, mesoporous, or nanoporous membrane that has a functional molecule attached, such as a functional polymer, to the surface and/or internal fibrillar structure of the membrane.

29 Claims, 8 Drawing Sheets

Related U.S. Application Data division of application No. 16/251,154, filed on Jan. 18, 2019, now Pat. No. 11,124,622, which is a division of application No. 14/710,951, filed on May 13, 2015, now Pat. No. 10,196,495.

(60) Provisional application No. 61/992,264, filed on May 13, 2014.

(51) Int. Cl.
*B32B 27/12* (2006.01)
*B32B 27/32* (2006.01)
*H01M 50/417* (2021.01)
*H01M 50/44* (2021.01)
*H01M 50/489* (2021.01)
*H01M 50/491* (2021.01)

(52) U.S. Cl.
CPC ........... *C08J 9/365* (2013.01); *H01M 50/417* (2021.01); *H01M 50/44* (2021.01); *B32B 2305/026* (2013.01); *B32B 2307/724* (2013.01); *C08J 2205/044* (2013.01); *C08J 2351/06* (2013.01); *H01M 50/489* (2021.01); *H01M 50/491* (2021.01); *Y10T 428/249978* (2015.04); *Y10T 442/2861* (2015.04); *Y10T 442/2918* (2015.04); *Y10T 442/3854* (2015.04); *Y10T 442/40* (2015.04); *Y10T 442/674* (2015.04)

(56) References Cited

U.S. PATENT DOCUMENTS

| | | |
|---|---|---|
| 6,080,057 A | 6/2000 | Yu |
| 6,602,593 B1 | 8/2003 | Callahan et al. |
| 8,016,894 B2 | 9/2011 | Selwyn et al. |
| 8,163,356 B2 | 4/2012 | Coulson |
| 8,361,276 B2 | 1/2013 | Selwyn |
| 8,361,456 B2 | 1/2013 | Dezawa et al. |
| 8,795,000 B2 | 8/2014 | Wei et al. |
| 2005/0011840 A1 | 1/2005 | Stankowski et al. |
| 2007/0004851 A1 | 1/2007 | Zeng |
| 2007/0019663 A1 | 1/2007 | Takagi et al. |
| 2008/0010782 A1 | 1/2008 | Sturdy |
| 2009/0098359 A1* | 4/2009 | Waller, Jr. ............... B01D 71/38 427/501 |
| 2010/0023452 A1 | 1/2010 | Brown |
| 2010/0320138 A1 | 12/2010 | Waller, Jr. et al. |
| 2011/0011455 A1 | 1/2011 | Ji et al. |
| 2011/0022348 A1 | 1/2011 | Lee et al. |
| 2012/0189898 A1 | 7/2012 | Wakizaka |
| 2013/0022876 A1 | 1/2013 | Stokes |
| 2013/0224472 A1* | 8/2013 | Freese ...................... C09D 7/45 516/200 |
| 2013/0277300 A1 | 10/2013 | Nunes et al. |
| 2015/0318527 A1 | 11/2015 | Rhodes |

OTHER PUBLICATIONS

Kim et al., "Plasma-modified Polyethylene Membrane as a Separator for Lithium-ion Polymer Battery", Electrochimica Acta, pp. 57-74 (2011).

* cited by examiner

FUNCTIONALIZED POROUS MEMBRANES AND METHODS OF MANUFACTURE AND USE

CROSS-REFERENCE TO RELATED APPLICATIONS

This application is a Divisional application to U.S. application Ser. No. 17/476,737, filed Sep. 16, 2021, which claims priority to U.S. Divisional application Ser. No. 16/251,154, filed Jan. 18, 2019, issued as U.S. Pat. No. 11,124,622 on Sep. 21, 2021, which claims priority to U.S. application Ser. No. 14/710,951, filed May 13, 2015, and issued as U.S. Pat. No. 10,196,495 on Feb. 5, 2019 and which claims priority to and benefit of U.S. Provisional Application No. 61/992,264 filed May 13, 2014, which is hereby incorporated herein by reference in its entirety.

FIELD OF INVENTION

The instant application relates to new or improved porous membranes, materials, textiles, composites, laminates, and/or methods of manufacture and/or use thereof. In at least selected embodiments, the porous membrane may be a functionalized microporous, mesoporous, or nanoporous membrane that has a functional molecule attached, such as a functional polymer, to the surface and/or internal fibrillar structure of the membrane.

BACKGROUND

Microporous membranes are known and can be made by various processes, and the process by which the membrane is made may have a material impact upon the membrane's physical attributes. See, Kesting, R., Synthetic Polymeric Membranes, A structural perspective, Second Edition, John Wiley & Sons, New York, N.Y., (1985). Three commercially viable processes for making microporous membranes include: the dry-stretch process (also known as the CEL-GARD® process), the wet process, and the particle stretch process.

The dry-stretch process refers to a process where pore formation results from stretching a nonporous precursor. See, Kesting, Ibid. pages 290-297, incorporated herein by reference. The dry-stretch process is different from the wet process and particle stretch process. Generally, in the wet process, also known as the phase inversion process, or the extraction process or the TIPS process (to name a few), the polymeric raw material is mixed with a processing oil (sometimes referred to as a plasticizer), this mixture is extruded, and then, the processing oil is removed (these films may be stretched before or after the removal of the oil). See, Kesting, Ibid. pages 237-286, incorporated herein by reference. Generally, in the particle stretch process, the polymeric raw material is mixed with particulate, this mixture is extruded, and pores are formed during stretching when the interface between the polymer and the particulate fractures due to the stretching forces. See, U.S. Pat. Nos. 6,057,061 and 6,080,507, incorporated herein by reference.

Moreover, the membranes arising from these processes may be physically different and the process by which each is made may distinguish one membrane from the other. Dry-stretch membranes may, in some instances, have slit shaped pores due to stretch in the machine direction. However, dry-stretch membranes may also be formed that have substantially round-shaped pores due to various stretching processes, such as machine direction stretching and transverse direction stretching. Wet process membranes may have, in some instances, rounder pores due to stretch in the transverse machine direction. Particle stretched membranes, on the other hand, may be filled with particulate needed for pore formation and may have elongated oval shaped pores. Accordingly, each membrane may be distinguished, in some instances, from the other by its method of manufacture.

While membranes made by the dry-stretch process have met with excellent commercial success, there is a need to improve their physical attributes so that they may be used in an even wider spectrum of applications. Some areas of improvement for such other applications may include pore shapes other than slits and increased transverse direction tensile strength.

U.S. Pat. No. 6,602,593, in some embodiments, is directed to a microporous membrane, made by a dry-stretch process, where the resulting membrane has a ratio of transverse direction tensile strength to machine direction tensile strength of 0.12 to 1.2. In some embodiments in that disclosure, the TD/MD tensile ratio is obtained by a blow-up ratio of at least 1.5 as the precursor is extruded.

U.S. Patent Publication No. 2007/0196638, now U.S. Pat. No. 8,795,565, incorporated herein in its entirety, discloses a microporous membrane made by a dry-stretch process. In some embodiments, the microporous membrane has substantially round shaped pores and a ratio of machine direction tensile strength to transverse direction tensile strength in the range of 0.5 to 5.0. The method of making the foregoing microporous membrane includes the steps of: extruding a polymer into a nonporous precursor, and biaxially stretching the nonporous precursor, the biaxial stretching including a machine direction stretching and a transverse direction stretching, the transverse direction including a simultaneous controlled machine direction relax.

U.S. Patent Publication No. 2011/0223486, incorporated herein in its entirety, discloses a microporous membrane made by a dry-stretch process that has substantially round shaped pores and a ratio of machine direction tensile strength to transverse direction tensile strength in the range of 0.5 to 6.0. The method of making the foregoing microporous membrane may include the steps of: extruding a polymer into a nonporous precursor, and biaxially stretching the nonporous precursor, the biaxial stretching including a machine direction stretching and a transverse direction stretching, the transverse direction including a simultaneous controlled machine direction relax. At least selected embodiments of such membranes were disclosed to be directed to biaxially oriented porous membranes, composites including biaxially oriented porous membranes, biaxially oriented microporous membranes, biaxially oriented macroporous membranes, battery separators, filtration media, humidity control media, flat sheet membranes, liquid retention media, and the like, related methods, methods of manufacture, methods of use, and the like.

Therefore, there is clearly an unmet need to develop new or improved microporous membranes that provide unique features for certain applications, for certain conditions, or the like.

SUMMARY OF THE INVENTION

In accordance with at least selected embodiments, aspects or objects, the present invention may address the above mentioned needs, issues or problems and may provide new or improved porous, microporous, mesoporous, or nanoporous membranes, materials, textiles, composites, laminates, fibers, or films, new or improved devices or products including these new or improved membranes, materials, textiles, composites, laminates, fibers, or films, such as garments, batteries, cells, consumer electronics, vehicles, or systems, and/or methods of manufacture and/or use thereof. Microporous membranes, like the Celgard® membranes discussed in the background section above, that have been functionalized by attaching a functional molecule, such as a functional polymer, to the surface and/or internal fibrillar structure of the membrane, may be usable as battery separators, as secondary lithium ion or lithium metal battery separators, or the like, or in other desired materials, textiles, composites, laminates, films, and/or the like.

DETAILED DESCRIPTION OF THE INVENTION

Figure 1:
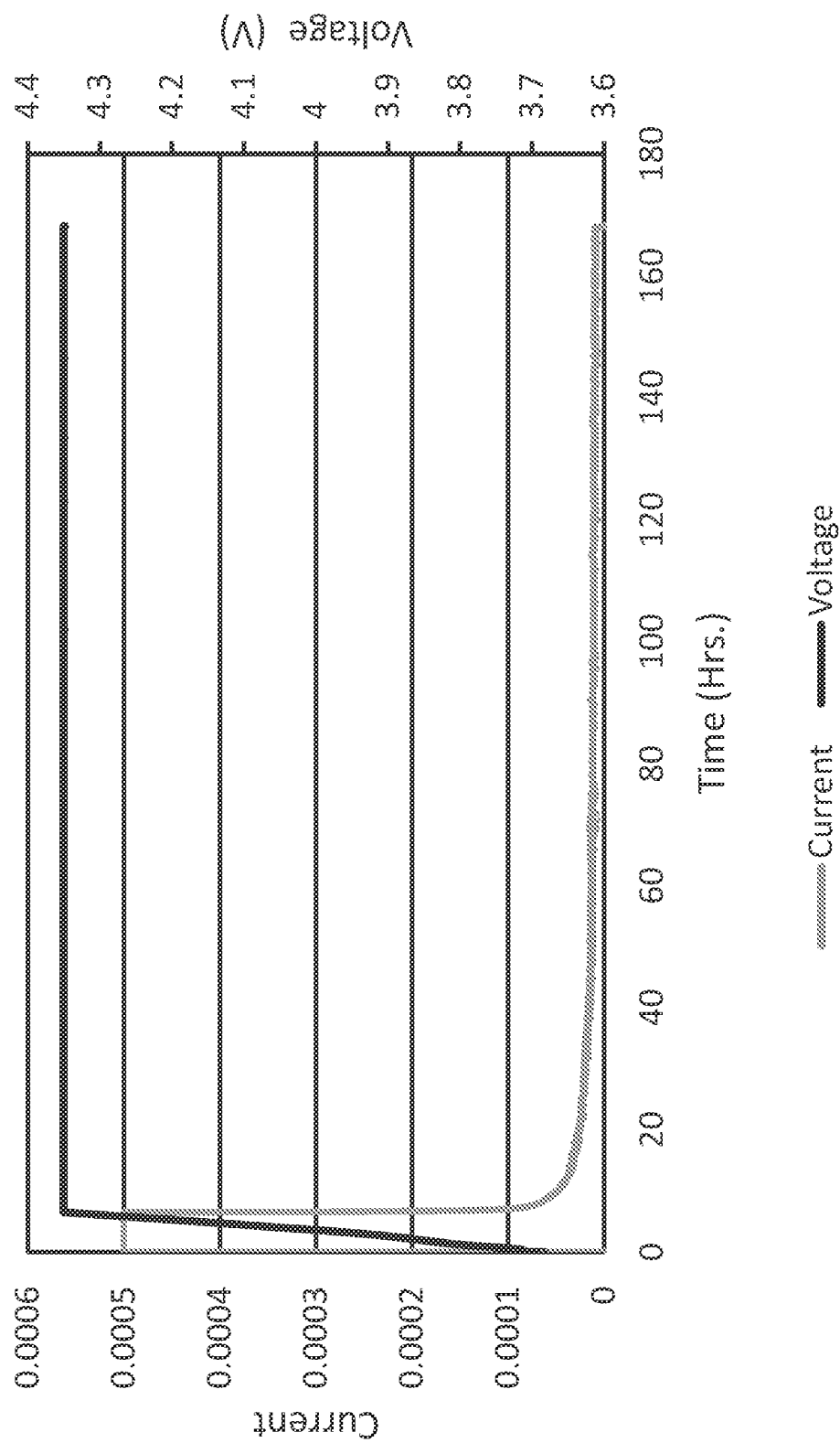
FIG. 1 includes a graph of trickle charge testing of a coin cell battery made using a control battery separator.

In accordance with at least selected embodiments, the present invention provides new or improved porous, microporous, mesoporous, or nanoporous membranes, materials, textiles, composites, laminates, fibers, or films, and/or methods of manufacture and/or use thereof. Microporous membranes, such as the Celgard® membranes discussed in the background section above, that have been functionalized by attaching a functional molecule, such as a functional polymer, to the surface and/or internal fibrillar structure of the membrane, may be usable as battery separators, as secondary lithium ion or lithium metal battery separators, or the like, or in other desired materials, textiles, composites, laminates, films, the like, etc. Various membranes useful in embodiments described herein include polyolefin membranes such as membranes comprising polyethylene, polypropylene, polymethylpentene, copolymers thereof, mixtures thereof, and so forth.

Functionalized, as used and described herein, may describe any process of adding or attaching a functional molecule to the surface and/or internal fibrillar structure of the microporous membrane. For example, and clearly not limited thereto, functionalization may include adding or attaching a functional polymer to the surface and/or internal fibrillar structure of the microporous membrane. Functionalization of a microporous membrane may be accomplished by various processes whether known or later discovered, including, but not limited to, a plasma vapor deposition process, such as one or more vacuum processes (see U.S. Patent Publication Nos. 2011/0114555 and 2010/0234524, now U.S. Pat. No. 8,163,356), and/or one or more atmospheric processes (see U.S. Pat. Nos. 8,361,276 and 8,016, 894 and U.S. Patent Publication No. 2008/0107822).

The functional molecule added, attached, or functionalized to the surface and/or internal fibrillar structure (or portions thereof) of the microporous membrane may be any desired molecule. The functional molecule may be a functional polymer, including, but not limited to those that are readily polymerized via radical processes such as acrylic acid, acryloyl chloride, methacrylic acid, hydroxyethyl acrylate, hydroxyethyl methacrylate, styrene, perfluorostyrene, perfluoro acrylates, semifluoroacrylates, partially fluorinated acrylates, allyl amine, vinyl amine, acrylate esters, and the like.

Functionalizing microporous membranes, such as by changing their surface properties, can expand the applications for such membranes and/or make them function more effectively. Functionalization generally may be accomplished by attaching a functional molecule, such as a functional polymer, to the surface and/or internal fibrillar structure of the membrane. Attaching the functional molecule to the internal fibrillar structure may be desired or desirable in some cases, such as where the functionality is required throughout the structure of the membrane. In addition, attaching the functional molecule to the internal fibrillar structure may increase the durability of the functionality, such as by protecting the functional molecule from removal by abrasion or by contact with fluids that do not wet out the membrane. In various embodiments, the functionalization described herein is able to essentially wrap every surface in the membrane with the desired functionality or modification because the vapor from the vapor deposition treatment can reach interior areas of the membrane that may be unreachable by more traditional methods of coating or attempting to modify membranes.

For some microporous membranes, attaching functional molecules to the internal fibrillar structure is made particularly difficult by the small pore size of the films. Celgard® membrane pore sizes, for example, may range generally, without limitation, from 0.03 µm to 0.2 µm in some instances, which in some cases is similar in size to the functional molecules being inserted into the membrane. Moreover, the ovular shape of the pores in some uniaxially stretched Celgard® membranes may, in some instances, increase the difficulty of inserting functional molecules into the membranes' internal structure. Even when the functional molecules can be successfully inserted, they often may block the pores and thus may impair the fundamental diffusion behavior or breathability of the membrane. By way of example only, when functional molecules are applied mechanically to a porous membrane via application of a traditional coating solution, such an application could lead to clogged pores for the membrane, less than 100% coverage, durability issues, and/or the like.

Plasma vapor deposition processes, such as, without limitation, various vacuum processes and various atmospheric processes have been surprisingly discovered as an effective means of durably depositing functional molecules, such as oleophobic fluoropolymers, onto the internal fibrillar structure of various porous membranes, such as, by way of example, Celgard® membranes. These vapor deposition processes have the distinct advantage of introducing the functional molecules to the film in monomer form, with the polymerization occurring on the surface of the film or membrane, for example, on the fibril surfaces of the film or membrane. As a result, the surface treatment:

Can be effective because of the high degree of coverage;
Can be durable because the surface treatment extends, or can extend, throughout the thickness of the film and may be covalently attached to the surface depending on mechanism and plasma intensity. Thus the modification may not be abraded off and may be unlikely to be removed via solvation;
May not impact the diffusion behavior or breathability of the film because the treatment may be applied to the fibrils at a molecular level and thus may have virtually no impact on the film's porous structure (i.e., the pores may not be blocked by the functional molecule); and
Can be modified with differing monomer species, particularly, but not limited to, those that are readily polymerized via radical processes such as acrylic acid, acryloyl chloride, methacrylic acid, hydroxyethyl acrylate, hydroxyethyl methacrylate, styrene, perfluorostyrene, perfluoro acrylates, partially fluorinated acrylates, semifluoroacrylates, allyl amine, vinyl amine, acrylate esters, and the like.

The ability to functionalize microporous membranes, including Celgard® films, using plasma vapor deposition processes can open various new applications for these membranes. For example, imparting durable oleophobicity to Celgard® films without meaningfully impacting their breathability may provide unique waterproof/breathable membranes, such as, for example, textile membranes. A durable oleophobic Celgard® film could also be used as a breathable barrier membrane in fragrance devices containing liquid fragrances, as these breathable barrier membranes allow fragrance vapor to permeate the membrane but retain the liquid fragrance. In addition, durable oleophobicity could be useful in both flat sheet and hollow fiber (capillary) membranes in various industrial applications, particularly for anti-fouling or to discourage the passage of low-surface energy fluids. Durable hydrophilicity and other functionality could also enable new medical diagnostic membrane applications. A wide range of functional molecules can be applied using the vapor deposition process. In addition, as stated above, the vapor deposition process is ideally suited to any microporous, mesoporous, or nanoporous membrane. Thus, a wide variety of membrane-functionalization combinations can be envisioned, including, without limitation, filtration, industrial and consumer textiles, and industrial separations.

In various embodiments herein, the functionalized membrane is both oleophobic and hydrophobic in that it does not like oil or water.

The functionalization of the membrane using a vapor deposition process can be accomplished in either a batch (single-piece) or roll-to-roll process. The substrate may include various materials or combinations of materials, including:

A single layer of microporous, mesoporous, or nanoporous membrane.
A bilayer or multilayer stack of microporous, mesoporous, or nanoporous membranes.
A laminate which incorporates one or more layers of microporous, mesoporous, or nanoporous membrane. Examples of such laminates include, but are not limited to, a microporous waterproof/breathable membrane laminated to a woven, nonwoven, or knit fabric, such as for waterproof/breathable outerwear. Such laminates can be constructed in 2-layer (membrane+outer shell fabric), 2.5 layer (printed membrane+outer shell fabric), and/or 3-layer (inner lining fabric+membrane+outer shell fabric) formats.

EXAMPLES

Example 1

Table 1 below represents the increased oil repellency with minimally impaired air permeability of various exemplary Celgard® microporous membranes that were functionalized with various plasma vapor deposition processes (in the Gurley air permeability test, a lower value corresponds to higher air permeability):

TABLE 1

| Celgard® Product | Plasma Vapor Deposition Method | Typical JIS Gurley (air permeability) before treatment (sec) | JIS Gurley (air permeability) after treatment (sec) | Oil repellency before treatment (AATCC TM 118) | Oil repellency after treatment (AATCC TM 118) |
|---|---|---|---|---|---|
| EZ2090 | Atmospheric Process | 50-75 | 50-75 | 0 | 2-6 |
| 2400 | Atmospheric Process on one side | 494-741 | 565 | 0 | 3-4 |
| 2400 | Atmospheric process on both sides | 494-741 | Infinite (zero air permeability) | 0 | 5-8 |
| EZ3030 | Vacuum Process (low rate) | 20-25 | 37 | 0 | <3 |
| EZ3030 | Vacuum Process (high rate) | 20-25 | 36 | 0 | <3 |
| EZ2090 | Vacuum Process (high rate) | 50-75 | 89 | 0 | 9 |
| EZ3030 | Vacuum Process (high rate) | 20-25 | 41 | 0 | 9 |
| EZ3030 | Vacuum Process (medium rate) | 20-25 | 28 | 0 | 9 |
| EZ3030 | Vacuum Process (low rate) | 20-25 | 25 | 0 | 7-8 |

Example 2

In the Examples below, various samples of Celgard® 2500 microporous membrane (Celgard® 2500 is a microporous monolayer polypropylene membrane that is about 25 microns thick) were used as the control samples. As the experimental samples, various samples of Celgard® 2500 microporous membrane were treated by vacuum plasma depositing fluorinated polymer on the surface of the membranes, with varying thicknesses. The coating or treatment of fluorinated polymer was added to only one side of the membrane to form a coated or treated membrane. Data from such deposition is reflected in Table 2 below:

TABLE 2

| Fluorinated Polymer Thickness (Å) on Celgard® 2500 Membrane | JIS Gurley (seconds) |
| --- | --- |
| 0 (Celgard® 2500 Membrane, "Control") | (~200) |
| 1641 | 840 |
| 2292 | 1441 |
| 1440 | Similar to Control (~200) |
| 201 | 192 |
| 390 | 190 |
| 686 | 185 |
| 2919 | 47579 |

The sample having the fluorinated polymer thickness of about 1440 angstroms had a JIS Gurley value close to the reported JIS Gurley value for Celgard® 2500 microporous membrane without coating or treatment. Thus, the "1440" sample was chosen to make battery separators.

Various "1440" coated samples (as well as control Celgard® 2500 samples) were then incorporated into batteries (coin cells) as battery separators, and battery tests were performed. During testing, the coated or treated side of the membrane (the surface or side including the vacuum plasma deposited fluorinated polymer coating or treatment) was placed facing the cathode in the battery. The separators were tested to determine whether oxidation was occurring against a high voltage cathode. Specifically, trickle charge testing was performed at 45° C. for one week. In this trickle charge testing, the coin cells were tested at a high or elevated voltage (potentially an "abusive" voltage for such a coin cell) where a peak, spike or battery failure during one week (about 168 hours) was expected for both control samples as well as inventive samples, which peaks, spikes or failures represent potential battery damage or degradation. The voltage was 4.35 volts (whereas the cathodes for these coin cells were rated to withstand about 3.8-4 volts).

Figure 2:
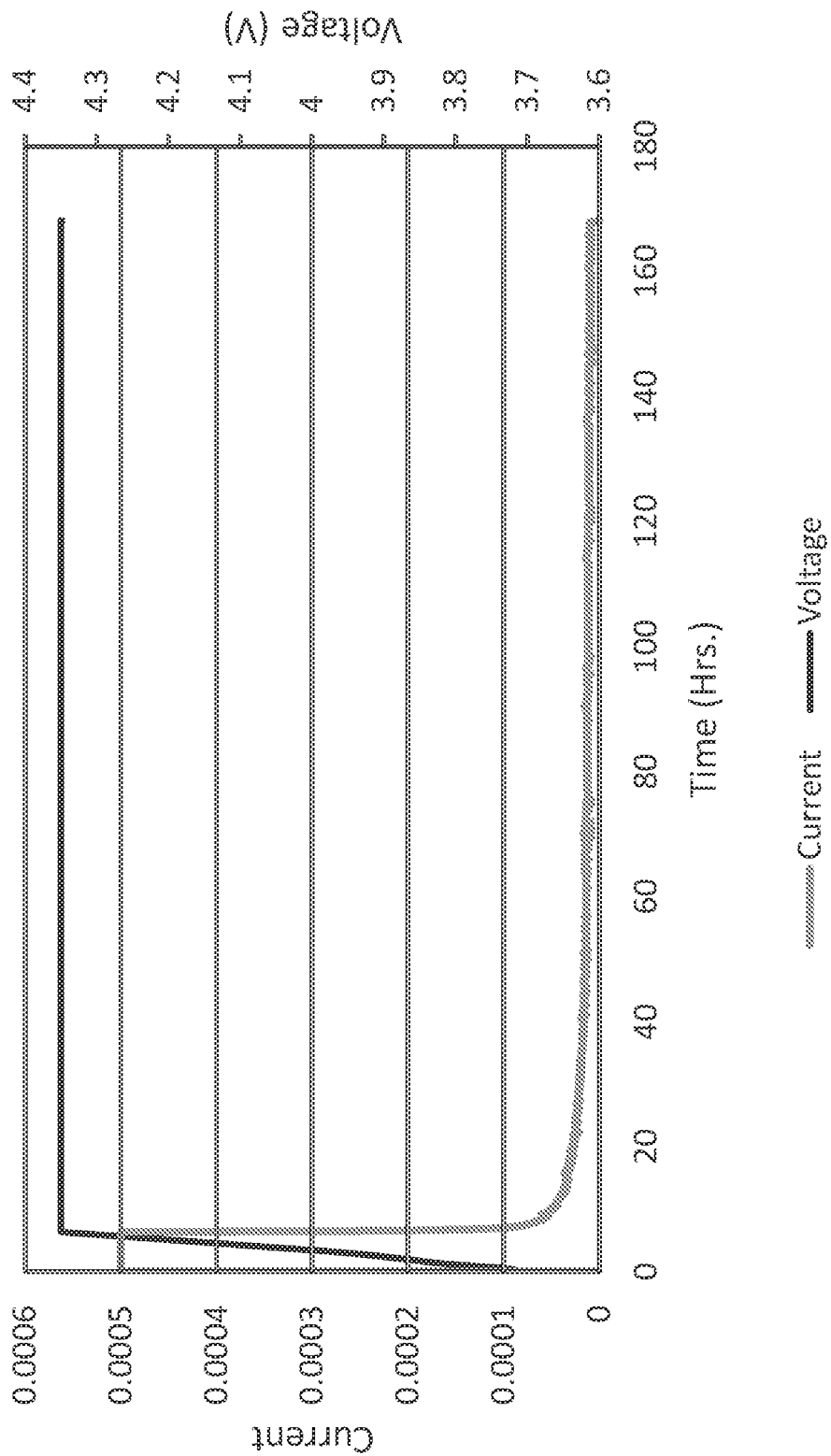
FIG. 2 includes a graph of trickle charge testing of another coin cell battery made using a control battery separator.
Figure 3:
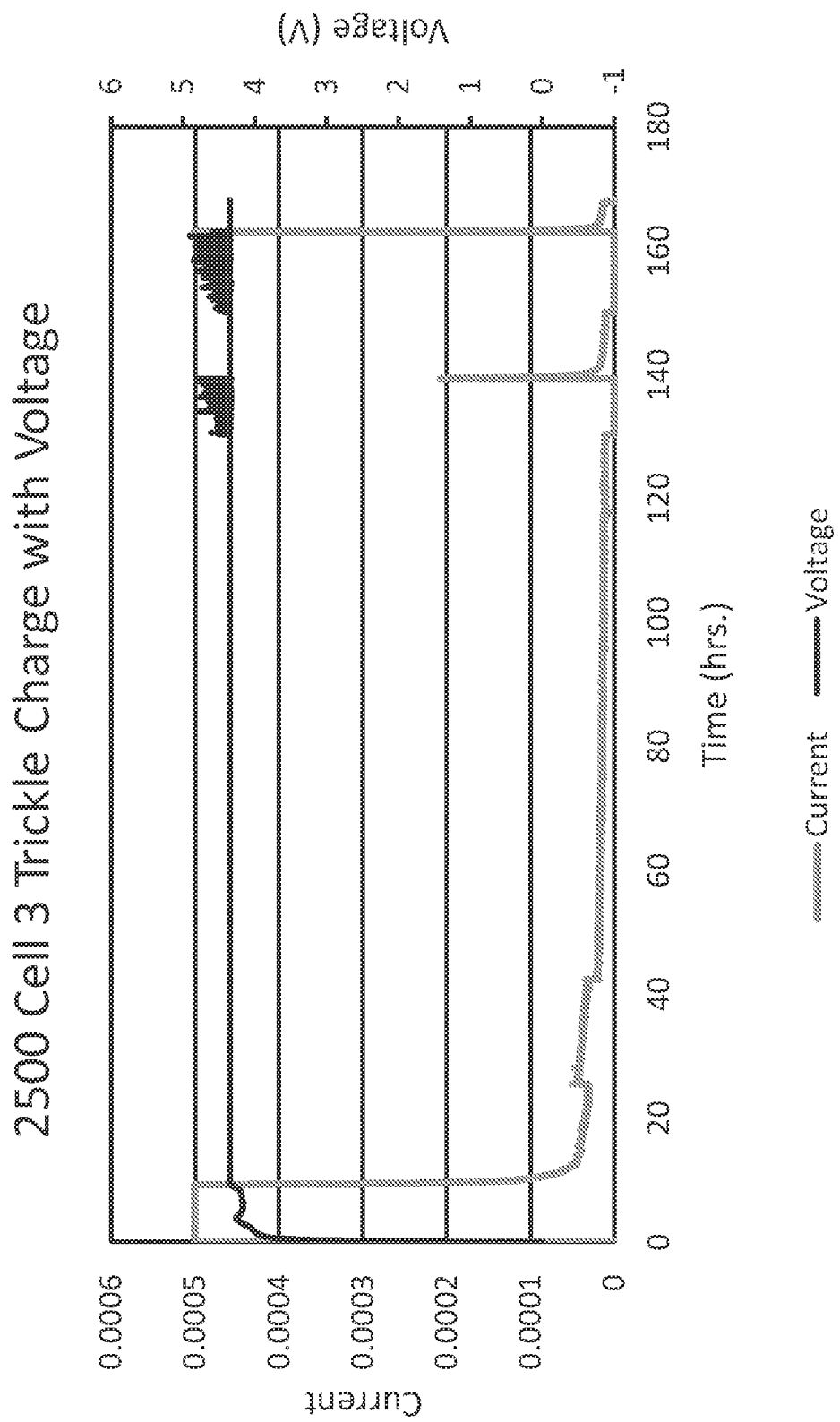
FIG. 3 includes a graph of trickle charge testing of another coin cell battery made using a control battery separator.
Figure 4:
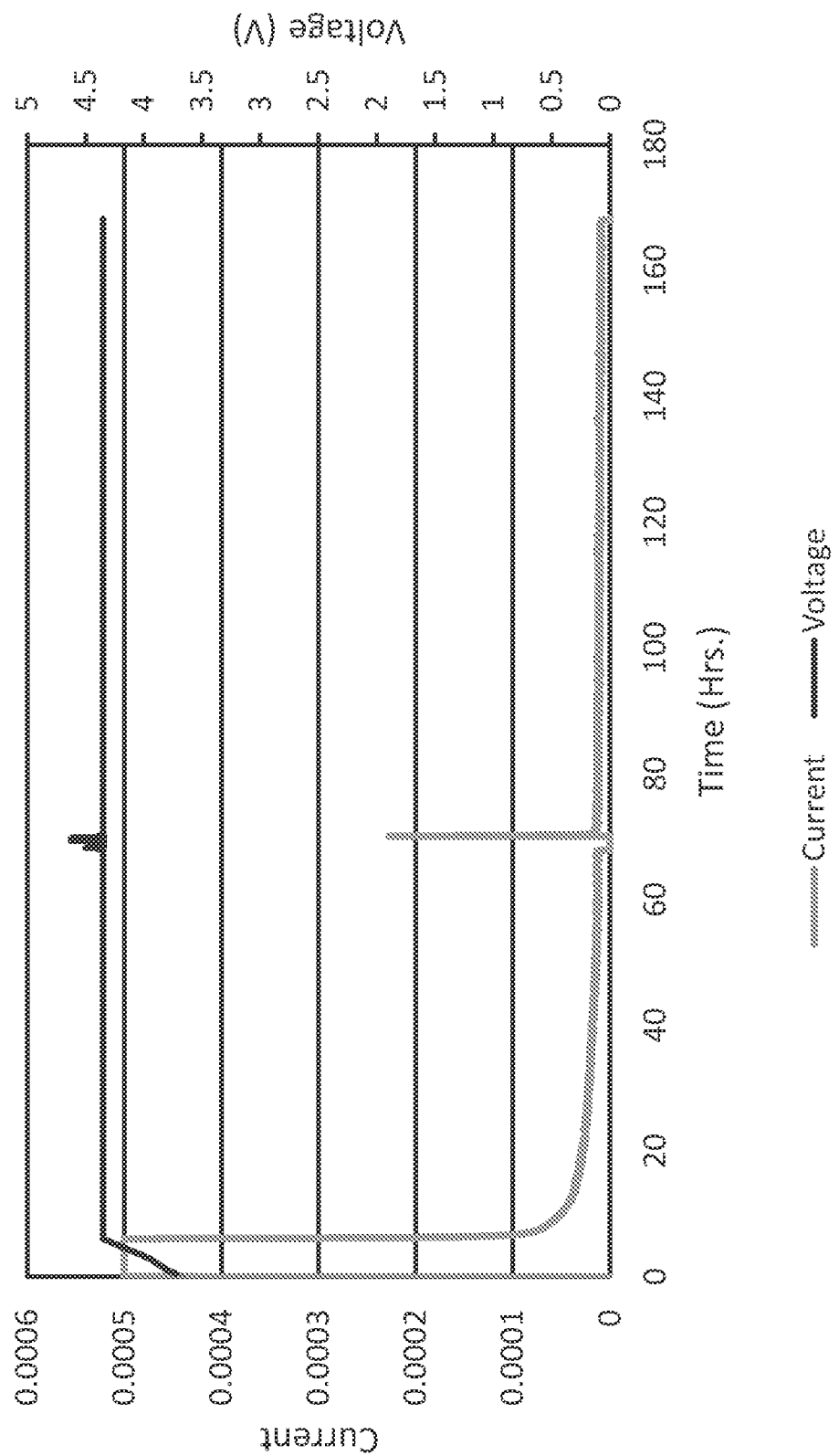
FIG. 4 includes a graph of trickle charge testing of yet another coin cell battery made using a control battery separator.
Figure 5:
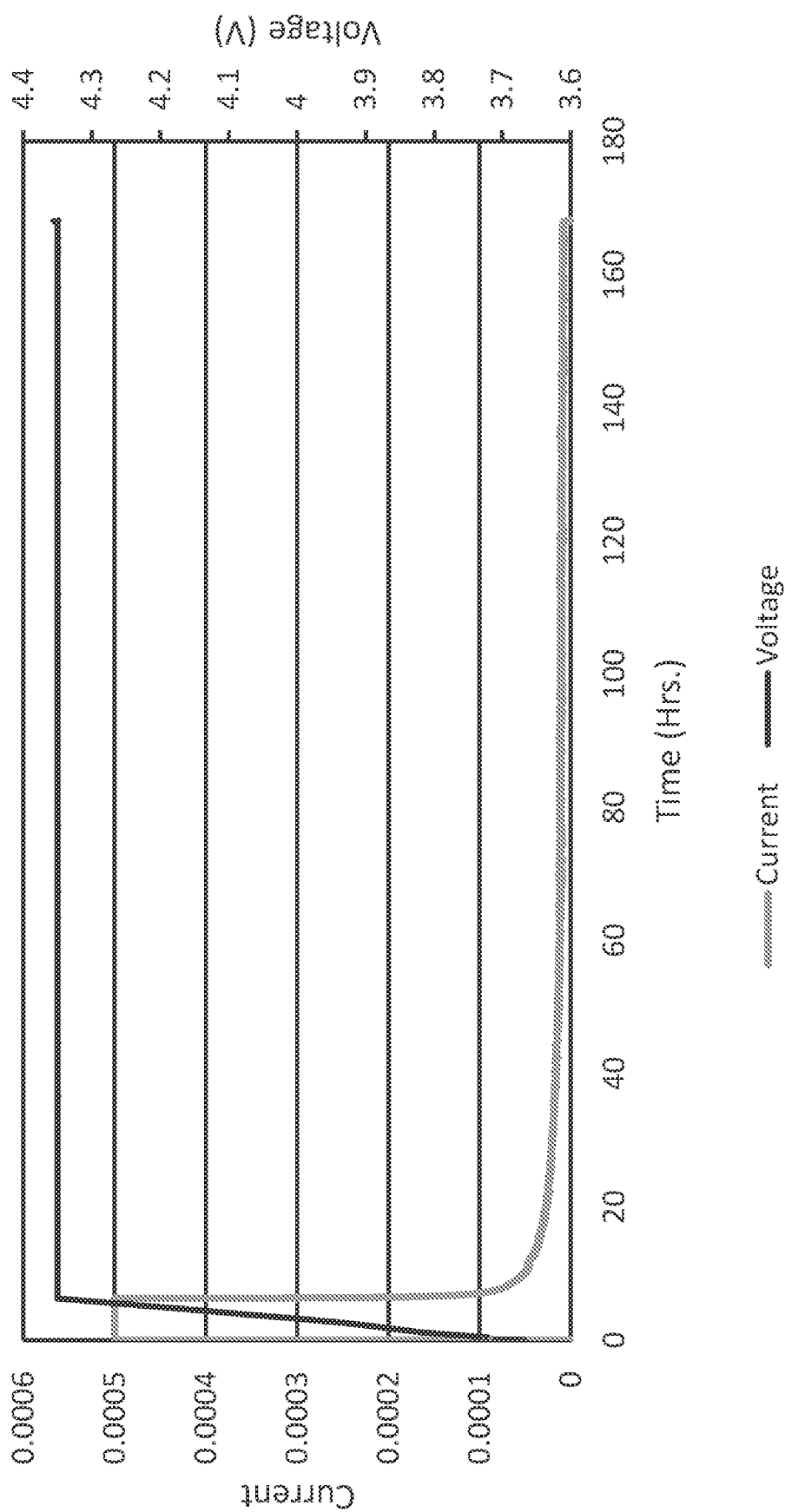
FIG. 5 includes a graph of trickle charge testing of a coin cell battery made using a battery separator comprising a functionalized membrane according to an embodiment described herein.
Figure 6:
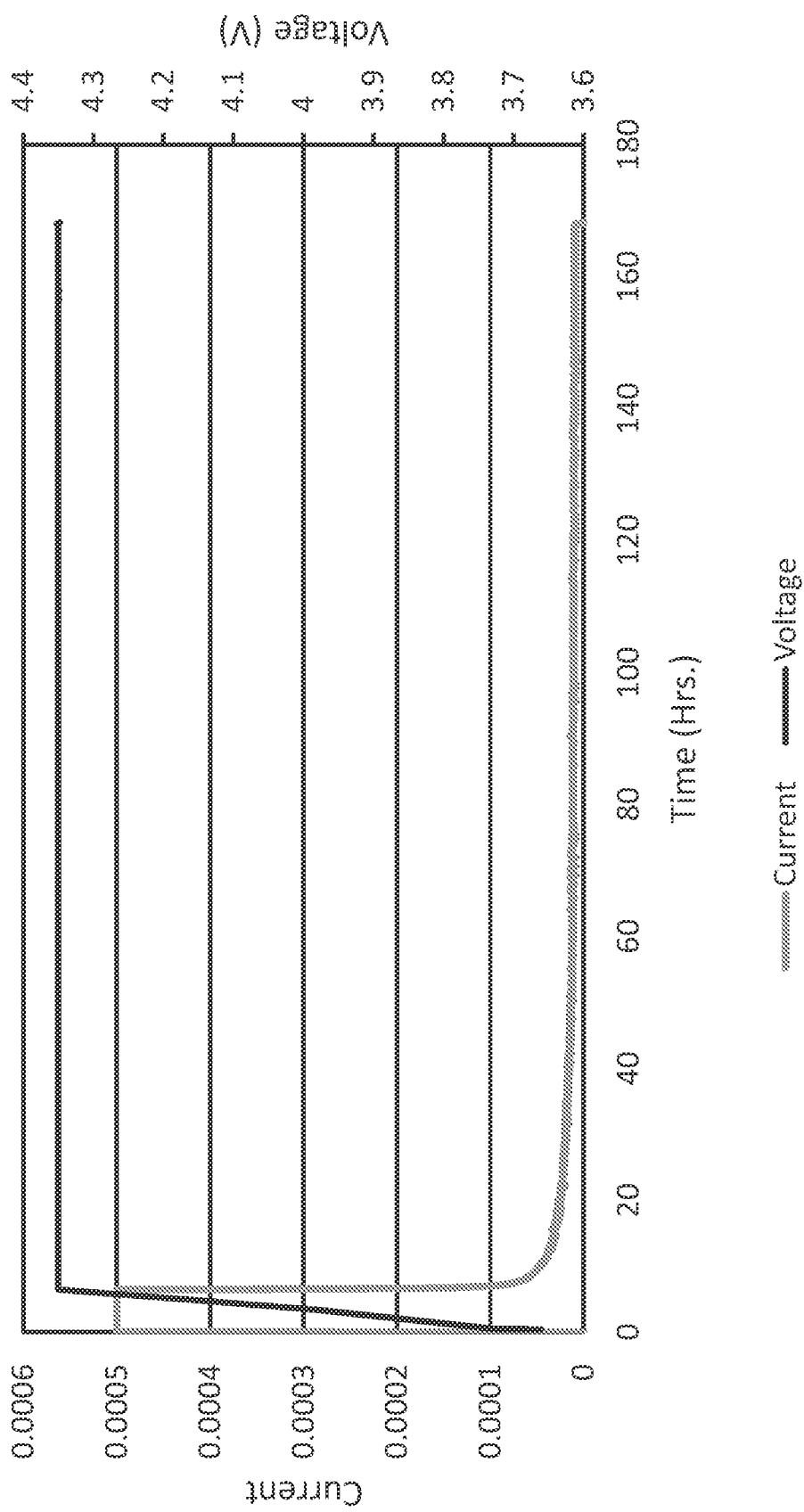
FIG. 6 includes a graph of trickle charge testing of another coin cell battery made using a battery separator comprising a functionalized membrane according to an embodiment described herein.
Figure 7:
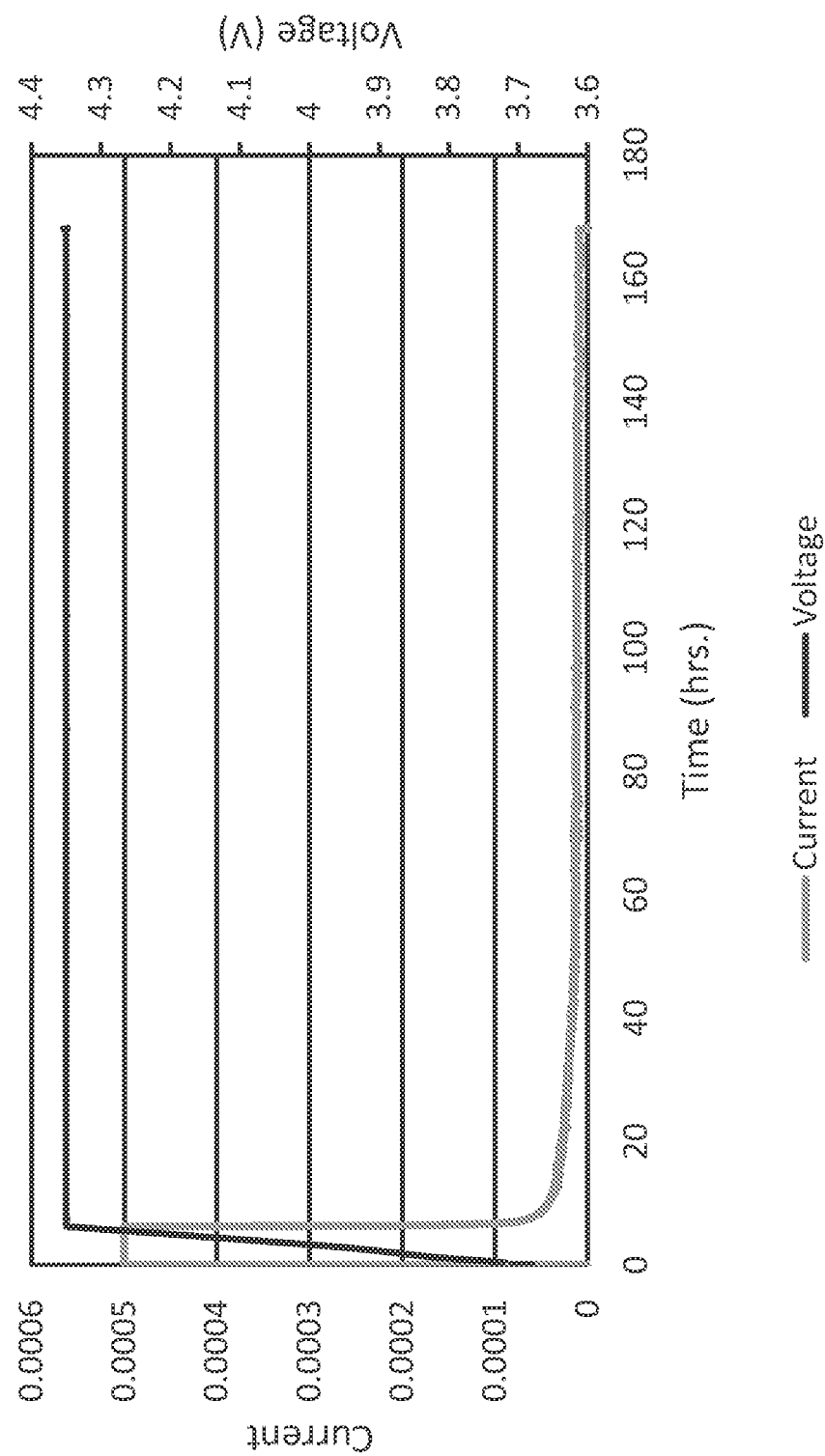
FIG. 7 includes a graph of trickle charge testing of another coin cell battery made using a battery separator comprising a functionalized membrane according to an embodiment described herein.
Figure 8:
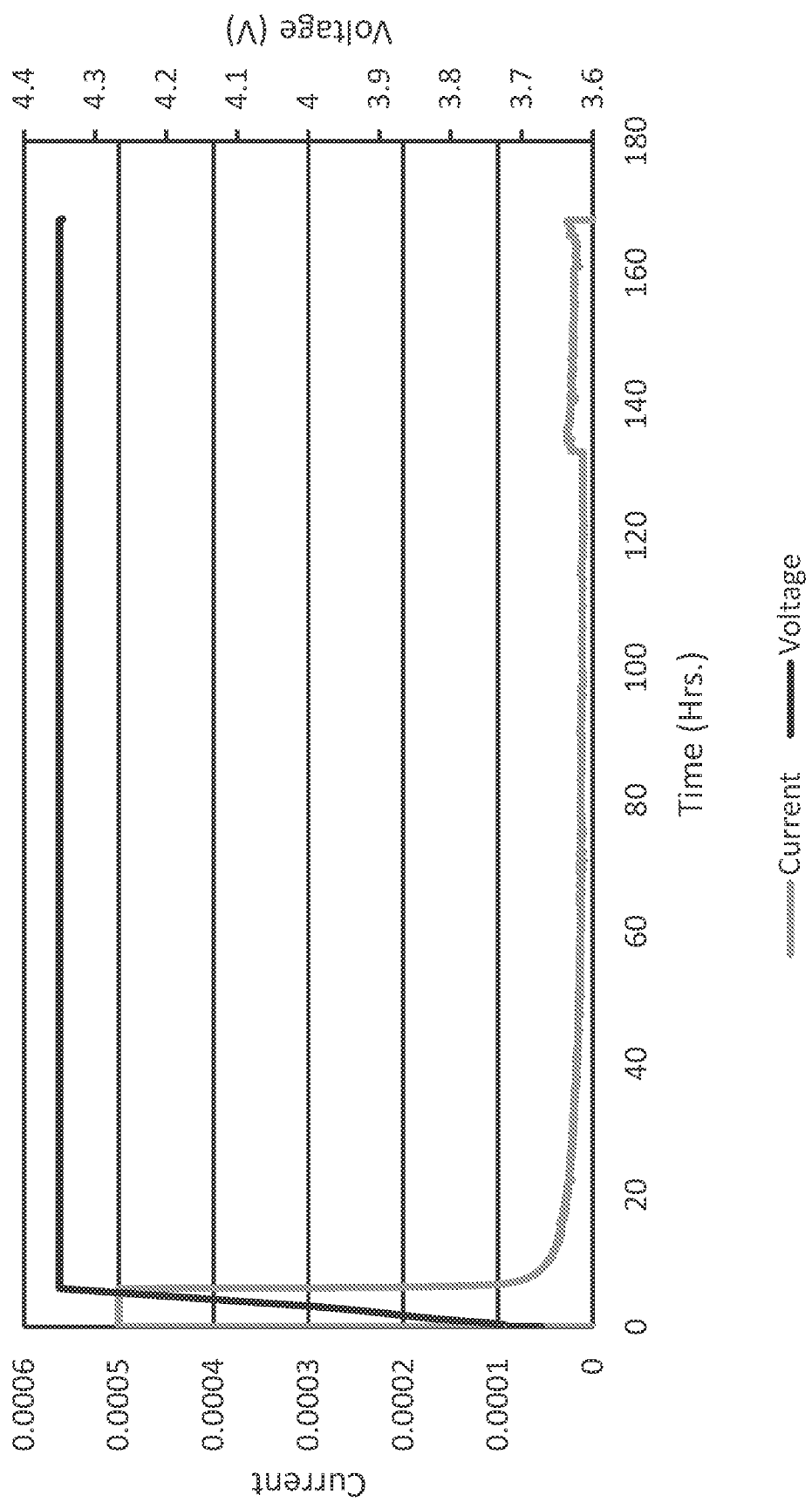
FIG. 8 includes a graph of trickle charge testing of yet another coin cell battery made using a battery separator comprising a functionalized membrane according to an embodiment described herein.

FIGS. 1 and 2 illustrate trickle charge testing graphs for two coin cells (1 and 2, respectively) made with the control Celgard® 2500 membrane as the battery separator. No failure was observed during these tests. However, for FIGS. 3 and 4, which also illustrate trickle charge testing graphs for two coin cells, Cells 3 and 6, respectively, made with the control Celgard® 2500 membrane as the battery separator, there are current peaks observed at about 140 and 160 hours for Cell 3 (see FIG. 3) and at about 70 hours for Cell 6 (see FIG. 4). Such current peaks could have been expected, as these coin cells are rated for lower voltage than the 4.35 volts to which they were subjected for this testing.

FIGS. 5-8 illustrate trickle charge testing graphs for four coin cells (Cells 1, 4, 5, and 6, respectively) made with the functionalized or coated or treated membrane of the present invention as the battery separator. No current peaks or failures were observed during these tests.

By modifying porous membranes with some form of vapor deposition, whether vacuum processes or atmospheric processes or others, the new membrane applications could include medical diagnostics, vent media, new opportunities for existing products such as filtration, degassing, gasifying, debubbling, among others.

Battery separator applications could include fluoropolymer materials for high voltage cell durability, hydrophilic treatments for enhanced wettability, or things like reactive silane and aluminum vapor treatments for a chemically "frosted" separators.

In accordance with at least selected embodiments, aspects or objects, the present invention may address the above mentioned needs, issues or problems and may provide new or improved porous, microporous, mesoporous, or nanoporous membranes, materials, textiles, composites, laminates, fibers, or films, new or improved devices or products including these new or improved membranes, materials, textiles, composites, laminates, or films, such as garments, batteries, cells, consumer electronics, vehicles, or systems, and/or methods of manufacture and/or use thereof. Microporous membranes, like the Celgard® membranes discussed in the background section above, that have been functionalized by attaching a functional molecule, such as a functional polymer, to the surface and/or internal fibrillar structure of the membrane, may be usable as battery separators, as secondary lithium ion or lithium metal battery separators, or the like, or in other desired materials, textiles, composites, laminates, films, and/or the like.

In accordance with at least selected embodiments, aspects or objects, there are provided:

A functionalized microporous, mesoporous, or nanoporous membrane, material, textile, composite, laminate, fiber, or the like.

A functionalized microporous, mesoporous, or nanoporous membrane, material, textile, composite, laminate, or the like as shown and described herein.

The above functionalized microporous, mesoporous, or nanoporous membrane, material, textile, composite, laminate, fiber, or the like being used as battery separators, secondary lithium ion or lithium metal battery separators, or the like, or in other desired materials, textiles, composites, laminates, films, or the like.

The above functionalized microporous, mesoporous, or nanoporous membrane, material, textile, composite, laminate, fiber, or the like, including:

a functionalized microporous, mesoporous, or nanoporous membrane.

The above functionalized microporous, mesoporous, or nanoporous membrane, material, textile, composite, laminate, fiber, or the like, including: wherein the functionalized microporous membrane being a microporous Celgard® membrane.

The above functionalized microporous, mesoporous, or nanoporous membrane, material, textile, composite, laminate, fiber, or the like, wherein the functionalized microporous, mesoporous, or nanoporous membrane includes a functional molecule added or attached to the surface and/or internal fibrillar structure of the membrane.

The above functionalized microporous, mesoporous, or nanoporous membrane, material, textile, composite, laminate, fiber, or the like, wherein the functional molecule being a functional polymer.

The above functionalized microporous, mesoporous, or nanoporous membrane, material, textile, composite, laminate, fiber, or the like, wherein the functional polymer being those that are readily polymerized via radical processes.

The above functionalized microporous, mesoporous, or nanoporous membrane, material, textile, composite, laminate, fiber, or the like, wherein the functional polymer being selected from the group consisting of: oleophobic fluoropolymers, acrylic acid, acryloyl chloride, methacrylic acid, hydroxyethyl acrylate, hydroxyethyl methacrylate, styrene, perfluorostyrene, perfluoro acrylates, semifluoroacrylates, allyl amine, vinyl amine, acrylate esters, and the like.

The above functionalized microporous, mesoporous, or nanoporous membrane, material, textile, composite, laminate, fiber, or the like, wherein the functionalized microporous, mesoporous, or nanoporous membrane being functionalized by a functionalization process.

The above functionalized microporous, mesoporous, or nanoporous membrane, material, textile, composite, laminate, or the like, where the functionalization process including adding or attaching said functional molecule to the surface and/or internal fibrillar structure of the microporous, mesoporous, or nanoporous membrane.

The above functionalized microporous, mesoporous, or nanoporous membrane, material, textile, composite, laminate, fiber, or the like, wherein the functionalization process being a plasma vapor deposition process.

The above functionalized microporous, mesoporous, or nanoporous membrane, material, textile, composite, laminate, fiber, or the like, wherein the plasma vapor deposition process being a vacuum process.

The above functionalized microporous, mesoporous, or nanoporous membrane, material, textile, composite, laminate, fiber, or the like, wherein the plasma vapor deposition process being an atmospheric process.

The above functionalized microporous, mesoporous, or nanoporous membrane, material, textile, composite, laminate, fiber, or the like, wherein the vapor deposition process introducing the functional molecules to the membrane in monomer form, with the polymerization occurring on the fibril surfaces of the film.

The above functionalized microporous, mesoporous, or nanoporous membrane, material, textile, composite, laminate, fiber, or the like, wherein the functionalizing microporous, mesoporous, or nanoporous membranes, having changed surface properties.

The above functionalized microporous, mesoporous, or nanoporous membrane, material, textile, composite, laminate, fiber, or the like, having increased durability of the functionality, such as by protecting the functional molecule from removal by abrasion or by contact with fluids that do not wet out the membrane.

The above functionalized microporous, mesoporous, or nanoporous membrane, material, textile, composite, laminate, fiber, or the like, wherein the membrane having pore sized ranging from 0.03 μm to 0.2 μm.

The above functionalized microporous, mesoporous, or nanoporous membrane, material, textile, composite, laminate, fiber, or the like, wherein the membrane having ovular shaped pores.

The above functionalized microporous, mesoporous, or nanoporous membrane, material, textile, composite, laminate, fiber, or the like, wherein the pores remain open or are not blocked by the functional molecule.

The above functionalized microporous, mesoporous, or nanoporous membrane, material, textile, composite, laminate, fiber, or the like, wherein the functionalization of the membrane being effective because of a high degree of coverage.

The above functionalized microporous, mesoporous, or nanoporous membrane, material, textile, composite, laminate, fiber, or the like, wherein the functionalization of the membrane being durable because the surface treatment extends, or can extend, throughout the thickness of the film and may be covalently attached to the surface depending on mechanism and plasma intensity, whereby the modification may not be abraded off and may be unlikely to be removed via solvation.

The above functionalized microporous, mesoporous, or nanoporous membrane, material, textile, composite, laminate, fiber, or the like, wherein the functionalization of the membrane does not impact the diffusion behavior or breathability of the film because the treatment is applied to the fibrils at a molecular level and thus has virtually no impact on the film's porous structure (i.e. the pores may not be blocked by the functional molecule).

The above functionalized microporous, mesoporous, or nanoporous membrane, material, textile, composite, laminate, fiber, or the like, wherein the functionalization of the membrane being modifiable with differing monomer species, including those that are readily polymerized via radical processes such as acrylic acid, acryloyl chloride, methacrylic acid, hydroxyethyl acrylate, hydroxyethyl methacrylate, styrene, perfluorostyrene, perfluoro acrylates, semifluoroacrylates, allyl amine, vinyl amine, acrylate esters, and the like.

The above functionalized microporous, mesoporous, or nanoporous membrane, material, textile, composite, laminate, fiber, or the like, wherein the functionalization of the membrane imparting durable oleophobicity to the films without meaningfully impacting their breathability.

The above functionalized microporous, mesoporous, or nanoporous membrane, material, textile, composite, laminate, fiber, or the like, wherein the functionalization of the membrane providing a unique waterproof/breathable textile.

The above functionalized microporous, mesoporous, or nanoporous membrane, material, textile, composite, laminate, fiber, or the like, wherein the functionalization of the membrane providing durable hydrophilicity.

The above functionalized microporous, mesoporous, or nanoporous membrane, material, textile, composite, laminate, fiber, or the like, wherein the functionalization of the membrane enabling new medical diagnostic membrane applications.

The above functionalized microporous, mesoporous, or nanoporous membrane, material, textile, composite, laminate, fiber, or the like, wherein the functionalization of the membrane providing a wide variety of membrane-functionalization combinations including filtration, industrial and consumer textiles, and industrial separations.

The above functionalized microporous, mesoporous, or nanoporous membrane, material, textile, composite, laminate, fiber, or the like, wherein the functionalization of the membrane being done in a batch (single-piece) or roll-to-roll process.

The above functionalized microporous, mesoporous, or nanoporous membrane, material, textile, composite, laminate, fiber, or the like, wherein the functionalized membrane being a single layer of microporous, mesoporous, or nanoporous membrane.

The above functionalized microporous, mesoporous, or nanoporous membrane, material, textile, composite, laminate, fiber, or the like, wherein the functionalized membrane being a bilayer or multilayer stack of microporous, mesoporous, or nanoporous membranes.

The above functionalized microporous, mesoporous, or nanoporous membrane, material, textile, composite, laminate, or the like, wherein the functionalized membrane being a laminate which incorporates one or more layers of microporous, mesoporous, or nanoporous membrane.

The above functionalized microporous, mesoporous, or nanoporous membrane, material, textile, composite, laminate, fiber, or the like, wherein the laminate being a microporous waterproof/breathable membrane laminated to a woven, nonwoven, or knit fabric, such as for waterproof/breathable outerwear.

The above functionalized microporous, mesoporous, or nanoporous membrane, material, textile, composite, laminate, or the like, wherein the laminate being constructed in 2-layer (membrane+outer shell fabric), 2.5 layer (printed membrane+outer shell fabric), and/or 3-layer (inner lining fabric+membrane+outer shell fabric) formats.

The above functionalized microporous, mesoporous, or nanoporous membrane, material, textile, composite, laminate, or the like, having improved characteristics as shown or described herein including without limitation:

| Plasma Vapor Deposition Method | Typical JIS Gurley (air permeability) before treatment (sec) | JIS Gurley (air permeability) after treatment (sec) | Oil repellency before treatment (AATCC TM 118) | Oil repellency after treatment (AATCC TM 118) |
|---|---|---|---|---|
| Atmospheric Process | 50-75 | 50-75 | 0 | 2-6 |
| Atmospheric Process on one side | 494-741 | 565 | 0 | 3-4 |
| Atmospheric process on both sides | 494-741 | Infinite (zero air permeability) | 0 | 5-8 |
| Vacuum Process (low rate) | 20-25 | 37 | 0 | <3 |
| Vacuum Process (high rate) | 20-25 | 36 | 0 | <3 |
| Vacuum Process (high rate) | 50-75 | 89 | 0 | 9 |
| Vacuum Process (high rate) | 20-25 | 41 | 0 | 9 |
| Vacuum Process (medium rate) | 20-25 | 28 | 0 | 9 |
| Vacuum Process (low rate) | 20-25 | 25 | 0 | 7-8 |

The above functionalized microporous, mesoporous, or nanoporous membrane, material, textile, composite, laminate, or the like, being used as a breathable barrier membrane in fragrance devices containing liquid fragrances (such as those sold under the Febreze Set & Refresh brand name).

The above functionalized microporous, mesoporous, or nanoporous membrane, material, textile, composite, laminate, fiber, or the like, being used in flat sheet and/or hollow fiber (capillary) membranes in various industrial applications (like for anti-fouling or to discourage the passage of low-surface energy fluids).

A method of making a functionalized microporous, mesoporous, or nanoporous membrane, material, textile, composite, laminate, fiber, or the like.

A method of making a functionalized microporous, mesoporous, or nanoporous membrane, material, textile, composite, laminate, fiber, or the like as shown and described herein.

A method of making a functionalized microporous, mesoporous, or nanoporous membrane, material, textile, composite, laminate, fiber, or the like comprising the steps of:
functionalizing the membrane with a functional molecule.

The above method of making a functionalized microporous, mesoporous, or nanoporous membrane, material, textile, composite, laminate, fiber, or the like, wherein the step of functionalizing the membrane with a functional molecule being by a functionalization process.

The above method of making a functionalized microporous, mesoporous, or nanoporous membrane, material, textile, composite, laminate, fiber, or the like, where the functionalization process including adding or attaching said functional molecule to the surface and/or internal fibrillar structure of the microporous, mesoporous, or nanoporous membrane.

The above method of making a functionalized microporous, mesoporous, or nanoporous membrane, material, textile, composite, laminate, fiber, or the like, wherein the functionalization process being a plasma vapor deposition process.

The above method of making a functionalized microporous, mesoporous, or nanoporous membrane, material, textile, composite, laminate, fiber, or the like, wherein the plasma vapor deposition process being a vacuum process.

The above method of making a functionalized microporous, mesoporous, or nanoporous membrane, material, textile, composite, laminate, fiber, or the like, wherein the plasma vapor deposition process being an atmospheric process.

The above method of making a functionalized microporous, mesoporous, or nanoporous membrane, material, textile, composite, laminate, fiber, or the like, wherein the vapor deposition process introducing the functional molecules to the membrane in monomer form, with the polymerization occurring on the fibril surfaces of the film.

In accordance with selected embodiments, a functionalized microporous, mesoporous, or nanoporous membrane, material, textile, composite, laminate, fiber, or the like, and/or a methods of making or using such functionalized membranes are provided. The functionalized porous membrane may be a functionalized microporous, mesoporous, or nanoporous membrane that has a functional molecule attached, such as a functional polymer, to the surface and/or internal fibrillar structure (or portions thereof) of the membrane.

The present invention may be embodied in other forms without departing from the spirit and the essential attributes thereof, and, accordingly, reference should be made to the appended claims, rather than to the foregoing specification, as indicating the scope of the invention. Additionally, the invention illustratively disclosed herein suitably may be practiced in the absence of any element which is not specifically disclosed herein.

The invention claimed is:

1. A functionalized microporous, mesoporous, or nanoporous membrane comprising a microporous, mesoporous, or nanoporous membrane and a functional molecule attached to an internal fibrillar structure of the membrane, wherein the functional molecule is a functional polymer selected from the group consisting of: oleophobic fluoropolymers, acrylic acid, acryloyl chloride, methacrylic acid, hydroxyethyl acrylate, hydroxyethyl methacrylate, styrene, perfluorostyrene, perfluoro acrylates, semifluoroacrylates, partially fluorinated acrylates, allyl amine, vinyl amine, acrylate esters, and combinations thereof.

2. A textile, film, composite, laminate, fiber, hollow fiber, filtration material, separations material, or a combination thereof, comprising a functionalized membrane according to claim 1.

3. A battery separator comprising a functionalized membrane according to claim 1.

4. The functionalized microporous, mesoporous, or nanoporous membrane according to claim 1, wherein the functionalized membrane comprises one or more polyolefins.

5. The functionalized microporous, mesoporous, or nanoporous membrane according to claim 1, wherein the functional polymer is a polymer that is polymerized via one or more radical processes.

6. The functionalized microporous, mesoporous, or nanoporous membrane according to claim 1, wherein the membrane comprises pores and wherein said pores remain open or are not blocked by the functional molecule.

7. The functionalized microporous, mesoporous, or nanoporous membrane according to claim 1, wherein the functionalized membrane provides a waterproof/breathable textile.

8. A medical diagnostic membrane comprising a functionalized membrane according to claim 1.

9. The functionalized microporous, mesoporous, or nanoporous membrane according to claim 1, wherein the functionalized membrane is a single layer of microporous, mesoporous, or nanoporous membrane.

10. The functionalized microporous, mesoporous, or nanoporous membrane according to claim 1, wherein the functionalized membrane is a bilayer or multilayer microporous, mesoporous, or nanoporous membrane.

11. The functionalized microporous, mesoporous, or nanoporous membrane according to claim 1, wherein the functionalized membrane is a laminate which comprises one or more layers of the functionalized microporous, mesoporous, or nanoporous membrane.

12. The functionalized microporous, mesoporous, or nanoporous membrane according to claim 11, wherein the laminate comprises a functionalized microporous waterproof/breathable membrane laminated to a woven layer, a nonwoven layer, a knit layer, or a combination thereof.

13. A breathable barrier membrane in a fragrance device containing one or more liquid fragrances comprising a functionalized membrane according to claim 1.

14. A flat sheet membrane and/or a hollow fiber (capillary) membrane comprising a functionalized membrane according to claim 1.

15. The functionalized microporous, mesoporous, or nanoporous membrane according to claim 1, wherein the membrane comprises pores, and wherein said pores are ovular shaped.

16. A functionalized microporous, mesoporous, or nanoporous membrane comprising a microporous, mesoporous, or nanoporous membrane and a functional molecule attached to an internal fibrillar structure of the membrane via a plasma deposition process, wherein the functional molecule is a functional polymer selected from the group consisting of: oleophobic fluoropolymers, acrylic acid, acryloyl chloride, methacrylic acid, hydroxyethyl acrylate, hydroxyethyl methacrylate, styrene, perfluorostyrene, perfluoro acrylates, semifluoroacrylates, partially fluorinated acrylates, allyl amine, vinyl amine, acrylate esters, and combinations thereof; and wherein the functionalized microporous, mesoporous, or nanoporous membrane has an oil repellency of 2-9, 2-6, 3-4, 5-8, or 7-8, after the plasma vapor deposition process.

17. The functionalized microporous, mesoporous, or nanoporous membrane of claim 16, wherein the functionalized microporous, mesoporous, or nanoporous membrane has a JIS Gurley of 25 to 595 second after the plasma vapor deposition process.

18. A method of functionalizing the functionalized microporous, mesoporous, or nanoporous membrane according to claim 1, comprising a plasma vapor deposition process.

19. The method of functionalizing the functionalized microporous, mesoporous, or nanoporous membrane according to claim 18, wherein the plasma vapor deposition process is a vacuum process.

20. The method of functionalizing the functionalized microporous, mesoporous, or nanoporous membrane according to claim 18, wherein the plasma vapor deposition process is an atmospheric process.

21. The method of functionalizing the functionalized microporous, mesoporous, or nanoporous membrane according to claim 18, wherein the plasma vapor deposition process introduces the functional molecule to the membrane in monomer form, with polymerization occurring on the internal fibrillar structure of the membrane.

22. The method of functionalizing the functionalized microporous, mesoporous, or nanoporous membrane according to claim 18, wherein the plasma vapor deposition process increases durability of the functional molecule on the membrane.

23. The method of functionalizing the functionalized microporous, mesoporous, or nanoporous membrane according to claim 18, wherein the plasma vapor deposition process imparts durable oleophobicity to the membrane.

24. The method of functionalizing the functionalized microporous, mesoporous, or nanoporous membrane according to claim 18, wherein the plasma vapor deposition process imparts durable hydrophilicity to the membrane.

25. The method of functionalizing the functionalized microporous, mesoporous, or nanoporous membrane according to claim 18, wherein the plasma vapor deposition process is a batch (single-piece) process, a roll-to-roll process, or a combination thereof.

26. A method of making a functionalized microporous, mesoporous, or nanoporous membrane, material, textile, composite, fiber, or laminate comprising the steps of:

providing a membrane;

functionalizing the membrane with a functional molecule by attaching said functional molecule to an internal fibrillar structure of the membrane wherein the functional molecule is a functional polymer selected from the group consisting of: oleophobic fluoropolymers, acrylic acid, acryloyl chloride, methacrylic acid, hydroxyethyl acrylate, hydroxyethyl methacrylate, styrene, perfluorostyrene, perfluoro acrylates, semifluoroacrylates, partially fluorinated acrylates, allyl amine, vinyl amine, acrylate ester, and combinations thereof.

27. The method of making a functionalized microporous, mesoporous, or nanoporous membrane, material, textile, composite, fiber, or laminate according to claim 26, wherein the step of functionalizing the membrane with a functional molecule comprises a functionalization process comprising a plasma vapor deposition process.

28. The method of making a functionalized microporous, mesoporous, or nanoporous membrane, material, textile, composite, fiber, or laminate according to claim 27, wherein the plasma vapor deposition process is a vacuum process.

29. The method of making a functionalized microporous, mesoporous, or nanoporous membrane, material, textile, composite, fiber, or laminate according to claim 27, wherein the plasma vapor deposition process is an atmospheric process.

* * * * *